United States Patent
Nozue et al.

(10) Patent No.: US 8,094,660 B2
(45) Date of Patent: Jan. 10, 2012

(54) VLAN SERVER

(75) Inventors: Daiki Nozue, Fujisawa (JP); Hiroaki Miyata, Yokohama (JP); Norihiro Kambe, Yokohama (JP); Shinsuke Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 12/194,630

(22) Filed: Aug. 20, 2008

(65) Prior Publication Data

US 2008/0310416 A1 Dec. 18, 2008

Related U.S. Application Data

(63) Continuation of application No. 10/898,221, filed on Jul. 26, 2004, now Pat. No. 7,420,979.

(30) Foreign Application Priority Data

Nov. 20, 2003 (JP) ................................ 2003-390337

(51) Int. Cl.
 *H04L 12/28* (2006.01)
(52) U.S. Cl. ....................................... 370/392; 370/389
(58) Field of Classification Search .................. 370/238, 370/250, 252, 352, 390, 395.1, 397, 389, 370/395, 400, 401, 392, 409, 449, 432, 469, 370/215, 245; 709/215, 238, 245
See application file for complete search history.

(56) References Cited

U.S. PATENT DOCUMENTS

| 5,684,800 | A | * | 11/1997 | Dobbins et al. | 370/401 |
|---|---|---|---|---|---|
| 5,959,989 | A | * | 9/1999 | Gleeson et al. | 370/390 |
| 6,085,238 | A | * | 7/2000 | Yuasa et al. | 709/223 |
| 6,618,388 | B2 | * | 9/2003 | Yip et al. | 370/401 |
| 6,895,429 | B2 | * | 5/2005 | Banga et al. | 709/215 |
| 7,127,524 | B1 | * | 10/2006 | Renda et al. | 709/245 |
| 7,162,509 | B2 | | 1/2007 | Brown et al. | |
| 7,194,519 | B1 | * | 3/2007 | Muhlestein et al. | 709/215 |
| 7,586,915 | B1 | * | 9/2009 | Indiresan et al. | 370/392 |
| 7,739,398 | B1 | * | 6/2010 | Shabtay | 709/232 |
| 2002/0087721 | A1 | * | 7/2002 | Sato et al. | 709/238 |
| 2002/0138628 | A1 | * | 9/2002 | Tingley et al. | 709/227 |
| 2003/0035398 | A1 | * | 2/2003 | Sato | 370/338 |
| 2003/0076832 | A1 | | 4/2003 | Ni | |

(Continued)

FOREIGN PATENT DOCUMENTS

JP 2003-167805 6/2003
(Continued)

OTHER PUBLICATIONS

"Architecture for Creating and Maintaining Virtual Filers on a Filer", pp. 1-65.

*Primary Examiner* — Aung S Moe
*Assistant Examiner* — Abdullah Riyami
(74) *Attorney, Agent, or Firm* — Antonelli, Terry, Stout & Kraus, LLP.

(57) ABSTRACT

A method for processing data received from at least one of VLANs, the method including: obtaining, based on a VLAN tag included in a MAC header of a MAC frame received from the VLAN and a first destination IP address included in an IP header of the MAC frame, a second destination IP address, changing the first destination IP address of the IP header to the second destination IP address, and generating an IP packet by deleting the MAC header from the MAC frame.

8 Claims, 12 Drawing Sheets

U.S. PATENT DOCUMENTS

| | | | |
|---|---|---|---|
| 2003/0135578 A1* | 7/2003 | Banga et al. | 709/215 |
| 2003/0167405 A1 | 9/2003 | Freund et al. | |
| 2003/0210696 A1* | 11/2003 | Goldflam | 370/395.1 |
| 2003/0219022 A1 | 11/2003 | Dillon et al. | |
| 2004/0047349 A1* | 3/2004 | Fujita et al. | 370/389 |
| 2004/0105440 A1* | 6/2004 | Strachan et al. | 370/389 |
| 2004/0249975 A1 | 12/2004 | Tuck et al. | |
| 2004/0252722 A1* | 12/2004 | Wybenga et al. | 370/474 |
| 2005/0013280 A1 | 1/2005 | Buddhikot et al. | |
| 2005/0071446 A1 | 3/2005 | Graham et al. | |
| 2005/0076164 A1* | 4/2005 | Malalur | 710/22 |
| 2005/0083949 A1 | 4/2005 | Dobbins et al. | 370/395.53 |
| 2005/0144292 A1* | 6/2005 | Banga et al. | 709/227 |
| 2005/0163102 A1 | 7/2005 | Higashitaniguchi et al. | 370/351 |
| 2005/0190775 A1* | 9/2005 | Tonnby et al. | 370/401 |
| 2005/0228835 A1* | 10/2005 | Roa | 707/204 |
| 2006/0062187 A1* | 3/2006 | Rune | 370/338 |
| 2006/0107108 A1* | 5/2006 | Geng et al. | 714/11 |
| 2006/0168321 A1 | 7/2006 | Eisenberg et al. | |
| 2006/0193252 A1 | 8/2006 | Naseh et al. | |
| 2006/0209834 A1 | 9/2006 | Bavant et al. | |
| 2006/0251085 A1* | 11/2006 | Kalkunte et al. | 370/400 |
| 2006/0291388 A1* | 12/2006 | Amdahl et al. | 370/230 |
| 2007/0081541 A1 | 4/2007 | Umekage et al. | |
| 2007/0140128 A1 | 6/2007 | Klinker et al. | |
| 2007/0242684 A1 | 10/2007 | Hayakawa et al. | |
| 2007/0297393 A1* | 12/2007 | Furukawa et al. | 370/352 |
| 2008/0056120 A1 | 3/2008 | Jha et al. | |
| 2010/0102987 A1* | 4/2010 | Lou et al. | 340/870.02 |

FOREIGN PATENT DOCUMENTS

JP  2003-223346  8/2003

* cited by examiner

310 VLAN-TAG NAT TABLE

| SERVER PROCESS | TAG | EXTERNAL IP ADDRESS | INTERNAL IP ADDRESS |
|---|---|---|---|
| SERVER PROCESS #1 | V1 | G1 | N1 |
| SERVER PROCESS #2 | V2 | G2 | N2 |
| SERVER PROCESS #3 | V3 | G3 | N3 |

FIG. 4

309 VIRTUAL-DEVICE-DRIVER SELECTION TABLE

| SERVER PROCESS | INTERNAL IP ADDRESS | VIRTUAL DEVICE DRIVER |
|---|---|---|
| SERVER PROCESS #1 | N1 | VIRTUAL DEVICE DRIVER #1 |
| SERVER PROCESS #2 | N2 | VIRTUAL DEVICE DRIVER #2 |
| SERVER PROCESS #3 | N3 | VIRTUAL DEVICE DRIVER #3 |

VLAN SERVER

CROSS REFERENCE TO RELATED APPLICATION

This is a continuation of U.S. application Ser. No. 10/898,221, filed Jul. 26, 2004 now U.S. Pat. No. 7,420,979. This application relates to and claims priority from Japanese Patent Application No. 2003-390337, filed on Nov. 20, 2003. The entirety of the contents and subject matter of all of the above is incorporated herein by reference.

BACKGROUND OF THE INVENTION

1. Field of the Invention

The present invention relates to virtual local-area-network (VLAN) servers, and more particularly, to a physical VLAN server connected to a network which employs TCP/IP and capable of providing services for a plurality of VLANs by itself alone.

2. Description of the Related Art

A virtual local area network (VLAN) refers to a technology for making a virtual group by terminals connected to a LAN irrespective of their physical connections.

A port VLAN refers to a system in which a port number is assigned to each VLAN in advance in a concentrator (hereinafter called a switching hub) installed in a LAN, a virtual group is formed for the port which each VLAN uses, and communications are made. A tag VLAN (according to the IEEE 802.1Q standard) refers to a system in which a tag (a predetermined value) is assigned to each VLAN in advance in a switching hub constituting a network, a virtual group is formed for the tag of data handled by each VLAN, and communications are made.

The value of the tag attached to a media-access-control (MAC) frame is used to identify the VLAN to which each terminal belongs. VLANs provide advantages. A LAN can be divided in order to reduce the amount of line traffic. A plurality of VLANs can share physical wiring to reduce cost. Since VLANs are easy to operate and administrate, they have been rapidly spreading to various types of corporations.

When a service usually provided by one server, such as a web application and a file transfer function, is provided for VLANs, it is disadvantageous in terms of cost and in terms of operation and administration to install one server in each VLAN.

To avoid this disadvantage, methods have been proposed in which one physical server is shared among VLANs. In such methods, it is suitable that the same number of identical application (such as web browsing or file transfer protocol (ftp)) processes (hereinafter called server processes) as the number of the VLANs are activated in the server. Such a server is provided, for example, by Japanese Unexamined Patent Publication No. 2003-167805.

In Japanese Unexamined Patent Publication No. 2003-167805, a server uses a VLAN tag to identify the closed network to which a communication destination client belongs. More specifically, a VLAN tag is attached to an MAC frame sent from a client, and therefore, the server can identify the VLAN to which the transmission source client of the frame belongs, by the use of the VLAN tag of a received frame. As a network protocol for transferring the received MAC frame to a server process, TCP/IP is used. The same number of TCP/IP stacks and the same number of device drivers as the number of accommodated closed networks are provided as a feature in Japanese Unexamined Patent Publication No. 2003-167805. In other words, each server process can communicate with a certain closed network by receiving data from the TCP/IP stack corresponding to the closed network.

In Japanese Unexamined Patent Publication No. 2003-167805, however, since a plurality of TCP/IP stacks and a plurality of device drivers are provided, a memory needs to have the same number of data items of each type, such as a routing table for determining a path to a communication destination and an address-resolution-protocol (ARP) table for managing the correspondence between an IP address and a MAC address, as the number of closed networks, which may cause an increase in the amount of used memory. In addition, in Japanese Unexamined Patent Publication No. 2003-167805, each of the communication flows for closed networks A to C corresponds to one computer, and therefore, the same number of computers as the number of the closed networks are required, which may cause an increase in used hardware.

SUMMARY OF THE INVENTION

In consideration of the foregoing points, it is an object of the present invention to provide a VLAN server for providing services for a plurality of VLANs with one TCP/IP stack and one device driver being installed and with one data item for each type, such as a routing table and an ARP table. When a plurality of VLANs are accommodated, even if only one TCP/IP stack and only one device driver are provided, the same number of pieces of routing information as the number of the VLANs are required. However, since the VLAN server does not have a plurality of routing tables, the amount of used memory is reduced as a whole by the amount used for common information repeatedly required if a plurality of routing tables are provided.

Another object of the present invention is to provide a VLAN server which solves the following issues in order to use only one TCP/IP stack and only one device driver.

(1) Identifying Each of the Same Type of Server Processes

Since one IP address is usually assigned to one network interface, and the same type of server processes have the same TCP port number, when only one TCP/IP stack is provided, the server processes cannot be identified in some cases. Therefore, it is necessary to identify server processes.

(2) Identifying the VLAN Serving as the Communication Destination of a Server Process Since a server process is located above TCP/IP in network protocol, the server process have no means to recognize a VLAN, which is below TCP/IP. It is necessary to identify the VLAN serving as the communication destination of the server process.

The present invention provides a VLAN server connected to a concentrator which accommodates a plurality of VLANs, and the VLAN server is for providing each VLAN with an application service. The VLAN server includes a plurality of processes for a plurality of application services, address change processing means for changing a destination address in data which is received from one of the plurality of VLANs through the concentrator, according to a tag attached by the concentrator, selection means for selecting a virtual device driver according to a destination address changed by the address change processing means, and a virtual device driver provided in association with the plurality of processes, for transmitting data received from NAT processing means through the selection means, to the plurality of processes.

The present invention also provides a VLAN server connected to a concentrator which accommodates a plurality of VLANs, and the VLAN server is for providing each VLAN with an application service. The VLAN server includes a plurality of processes for a plurality of application services, a plurality of virtual device drivers provided in association with the plurality of processes, address change processing means for receiving data from a process of the plurality of processes through a corresponding virtual device driver of the plurality of virtual device driver, and for changing a transmission-source address and adding a tag according to the transmission-source address, and transmission means for transmitting data sent from the address change processing means, to the concentrator.

The foregoing objects are achieved in one aspect of the present invention through the provision of a VLAN server connected to a plurality of VLANs, for providing each VLAN with an application service, the VLAN server including a plurality of processes for a plurality of application services, a plurality of virtual device drivers provided in association with the plurality of processes, a receiving-address change processing section for changing a destination address in data which is received from each VLAN and to which a VLAN tag is attached, according to the VLAN tag, and a selection section for selecting one of the virtual device drivers according to a destination address changed by the receiving-address change processing section, wherein, when a process of the plurality of processes in the VLAN server receives data from a client, the receiving-address change processing section obtains an internal IP address corresponding to a VLAN tag taken out of a received MAC frame, changes a destination IP address from an external IP address to the internal IP address, deletes a MAC header to generate an IP packet, and transmits the IP packet to the selection section; the selection section selects a virtual device driver of the plurality of virtual device driver, corresponding to the destination IP address of the IP packet; the selected virtual device driver transmits the IP packet received from the selection section, to the process; and the process, having the destination IP address and waiting for data, receives data of the IP packet and executes processing.

The foregoing objects are achieved in another aspect of the present invention through the provision of a VLAN server connected to a plurality of VLANs, for providing each VLAN with an application service, the VLAN server including a plurality of processes for a plurality of application services, a plurality of virtual device drivers provided in association with the plurality of processes, and a transmission-address change processing section for receiving data from a process of the plurality of processes through a corresponding virtual device driver of the plurality of virtual device driver, and for changing a transmission-source address and adding a tag according to the transmission-source address, wherein, when a process of the plurality of processes in the VLAN server transmits data to a client, the process issues data in which a transmission-source address is an internal IP address; the transmission-address change processing section obtains a VLAN tag and an external IP address corresponding to the internal IP address of the transmission source, changes the transmission-source IP address to the external IP address in an IP packet, and adds a MAC header which includes the obtained VLAN tag to the IP packet to generate a MAC frame; and the transmission-address change processing section transmits the generated MAC frame to a corresponding VLAN.

The foregoing objects are achieved in yet another aspect of the present invention through the provision of a VLAN server connected to a plurality of VLANs, for providing each VLAN with an application service, the VLAN server including a plurality of processes for a plurality of application services, a plurality of virtual device drivers provided in association with the plurality of processes, a receiving-address change processing section for changing a destination address in data which is received from each VLAN and to which a VLAN tag is attached, according to the VLAN tag, a selection section for selecting one of the virtual device drivers according to a destination address changed by the receiving-address change processing section, and a transmission-address change processing section for receiving data from a process of the plurality of processes through a corresponding virtual device driver of the plurality of virtual device driver, and for changing a transmission-source address and adding a tag according to the transmission-source address, wherein, when a process of the plurality of processes in the VLAN server receives data from a client, the receiving-address change processing section obtains an internal IP address corresponding to a VLAN tag taken out of a received MAC frame, changes a destination IP address from an external IP address to the internal IP address, deletes a MAC header to generate an IP packet, and transmits the IP packet to the selection section; the selection section selects a virtual device driver of the plurality of virtual device driver, corresponding to the destination IP address of the IP packet; the selected virtual device driver transmits the IP packet received from the selection section, to the process; and the process, having the destination IP address and waiting for data, receives data in the IP packet and executes processing, and wherein, when a process of the plurality of processes in the VLAN server transmits data to a client, the process issues data in which a transmission-source address is an internal IP address; the transmission-address change processing section obtains a VLAN tag and an external IP address corresponding to the internal IP address of the transmission source, changes the transmission-source IP address to the external IP address in an IP packet, and adds a MAC header which includes the obtained VLAN tag to the IP packet to generate a MAC frame; and the transmission-address change processing section transmits the generated MAC frame to a corresponding VLAN.

According to the present invention, since one VLAN server for providing a plurality of VLANs with services have only one TCP/IP stack and only one device driver although the VLAN server has a plurality of server processes, the amount of used memory is reduced because only one routing table and only one ART table are required.

The present invention also provides advantages that the problems generated when only one TCP/IP stack and only one device driver are used are solved in the following ways.
(1) Identifying Each of the Same Type of Server Processes Usually, only one IP address can be assigned to one network interface in one TCP/IP stack. By providing a plurality of virtual device drivers, it appears as if there is provided a plurality of network interfaces, and the VLAN server can have a plurality of IP addresses.

Different internal IP addresses are assigned to server processes even if they have the same port number. Therefore, each process can be identified.
(2) Identifying the VLAN Serving as the Communication Destination of a Server Process Since the NAT associates VLAN tags with internal IP addresses, a server process can communicate with the corresponding VLAN only.

Conventionally, a usual server connected to a LAN has only one TCP/IP stack. When the server is used as a server shared by VLANs, the TCP/IP stack does not need to be changed, but only drivers need to be changed, according to the present invention. Therefore, a server shared by VLANs can be easily implemented.

DESCRIPTION OF THE PREFERRED EMBODIMENTS

A VLAN server for providing services for a plurality of VLANs with the use of only one TCP/IP stack will be described below.

1. Structure of VLAN Server

Figure 1:
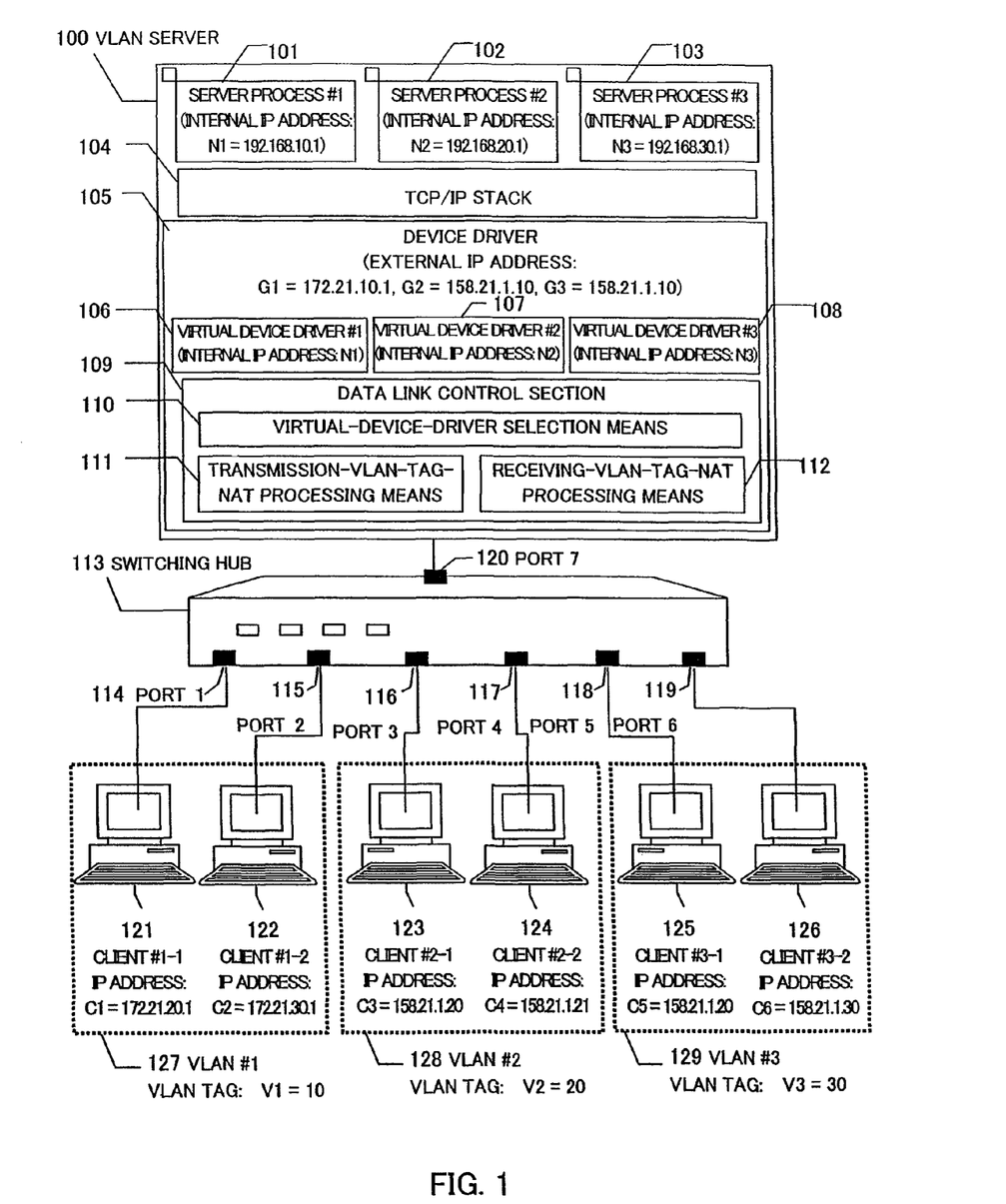
FIG. 1 is a system configuration view according to an embodiment of the present invention.

FIG. 1 is a system configuration view according to an embodiment of the present invention.

Usually, a VLAN server accommodates a plurality of VLANs. In the present embodiment, the number of VLANs accommodated by a VLAN server 100 is set to three as an example.

The VLAN server 100 is connected to clients 121 to 126 (clients #1-1 to #3-2) through a switching hub (concentrator) 113. The client 121 (client #1-1) and client 122 (client #1-2) connected to a port 114 (port 1) and a port 115 (port 2) of the switching hub 113 belong to a VLAN 127 (VLAN #1), the client 123 (client #2-1) and client 124 (client #2-2) connected to a port 116 (port 3) and a port 117 (port 4) of the switching hub 113 belong to a VLAN 128 (VLAN #2), and the client 125 (client #3-1) and client 126 (client #3-2) connected to a port 118 (port 5) and a port 119 (port 6) of the switching hub 113 belong to a VLAN 129 (VLAN #3).

The VLAN server 100 is connected to a port 120 (port 7) of the switching hub 113. Data communication (transmission and receiving) is allowed between the port 114 (port 1) and the port 115 (port 2), between the port 116 (port 3) and the port 117 (port 4), and between the port 118 (port 5) and the port 119 (port 6), but is not allowed when data passes through different VLANs, for example, between the port 114 (port 1) and the port 116 (port 3) (these are port VLANs). Data communication is allowed between the port 120 (port 7) and each of the ports 114 to 119 (port 1 to port 6). In that case, the switching hub 113 attaches a VLAN tag to a MAC frame, and the corresponding VLAN is identified by the VLAN tag (these are tag VLANs).

The VLAN server 100 activates the same number of server processes 101 to 103 (server processes #1 to #3) as the number of the VLANs 127 to 129, for providing services, such as web browsing and ftp, for the VLANs. When the VLAN server 100 is used as a web-browsing-dedicated server, the plurality of these server processes are all web-browsing server processes. When a different service is provided for each VLAN, it is possible, for example, that a web-browsing server process is activated for the VLAN #1, and an ftp server process is activated for the VLAN #2. The VLAN server 100 is also provided with a TCP/IP stack 104 for generating IP packets from data sent from a server process and for passing IP packets sent to a server process, to the server process, and a device driver 105 connected to the TCP/IP stack 104 on a protocol stack, for transmitting IP packets to the outside of the VLAN server 100 and for receiving data from the outside of the VLAN server 100 to pass it to the TCP/IP stack 104.

The device driver 105 is provided with the same number of virtual device drivers 106 to 108 (virtual device drivers #1 to #3) as the number of VLANs, and a data link control section 109.

Virtual device drivers are provided by registering an identical device driver a plurality of times with different names to make it look like a plurality of network interfaces for a TCP/IP stack. Since an IP address can be assigned to each of a plurality of network interfaces, a different IP address is assigned to each virtual device driver to make it possible that a plurality of IP addresses is registered in a VLAN server.

The data link control section 109 is provided with a virtual-device-driver selection means (selection section) 110, a transmission-VLAN-tag-NAT processing means (transmission-address-change processing section) 111, and a receiving-VLAN-tag-NAT processing means (receiving-address-change processing section) 112. The virtual-device-driver selection means 110 determines the virtual device driver to which a packet received from the TCP/IP stack 104 is sent, and passes the packet to the determined driver.

The transmission-VLAN-tag-NAT processing means 111 changes the transmission-source IP address of a packet to be transmitted, to a predetermined external IP address by the use of network address translation (NAT), attaches a MAC header to form a MAC frame, and writes a VLAN tag into the MAC header. A NAT method used at the transmission side will be described later by referring to FIG. 10 to FIG. 12.

The receiving-VLAN-tag-NAT processing means 112 changes the transmission-destination IP address of a received MAC frame to an appropriate internal IP address by the use of NAT, and deletes the MAC header to make an IP packet. A NAT method used at the receiving side will be described later by referring to FIG. 7 to FIG. 9.

The server processes 101 to 103 (server processes #1 to #3) have internal IP addresses not open to the VLANs. For example, the server process #1 has an internal IP address of 192.168.10.1 (hereinafter called N1), the server process #2 has an internal IP address of 192.168.20.1 (hereinafter called N2), and the server process #3 has an internal IP address of 192.168.30.1 (hereinafter called N3). N1, N2, and N3 each have different values, as in this example.

The virtual device drivers 106 to 108 (virtual device drivers #1 to #3) also have internal IP addresses N1 to N3 in the same way. In the current example, the internal IP addresses N1 to N3 of the virtual device drivers 106 to 108 are the same as the internal IP addresses N1 to N3 of the server processes, respectively. The device driver 105 has external IP addresses made open to VLANs, 172.21.10.1 (hereinafter called G1), 158.21.1.10 (hereinafter called G2), and 158.21.1.10 (hereinafter called G3). The clients 121 and 122 in the VLAN 127 (VLAN #1) use a server IP address of G1 to communicate with the VLAN server 100, the clients in the VLAN 128 (VLAN #2) use a server IP address of G2, and the clients in the VLAN 129 (VLAN #3) use a server IP address of G3.

Since direct communications are not allowed between two of the VLAN 127 (VLAN #1), the VLAN 128 (VLAN #2), and the VLAN 129 (VLAN #3), the corresponding IP addresses may be identical among the VLANs. Therefore, no problem occurs even if the external IP addresses G1, G2, and G3 of the server are identical as two of them are identical in the current example. The registration of external IP addresses and internal IP addresses in the VLAN server will be described later by referring to FIG. 6.

The clients 121 to 126 (clients #1-1 to #3-2) have IP addresses C1 to C6. The clients should not have an identical IP address within a VLAN, but may have an IP address identical to that of a client in another VLAN. In the present embodiment, for example, the client 123 (client #2-1) belonging to the VLAN 128 (VLAN #2) has the same IP address (158.21.1.20) as the client 125 (client #3-1) belonging to the VLAN 129 (VLAN #3).

Figure 2:
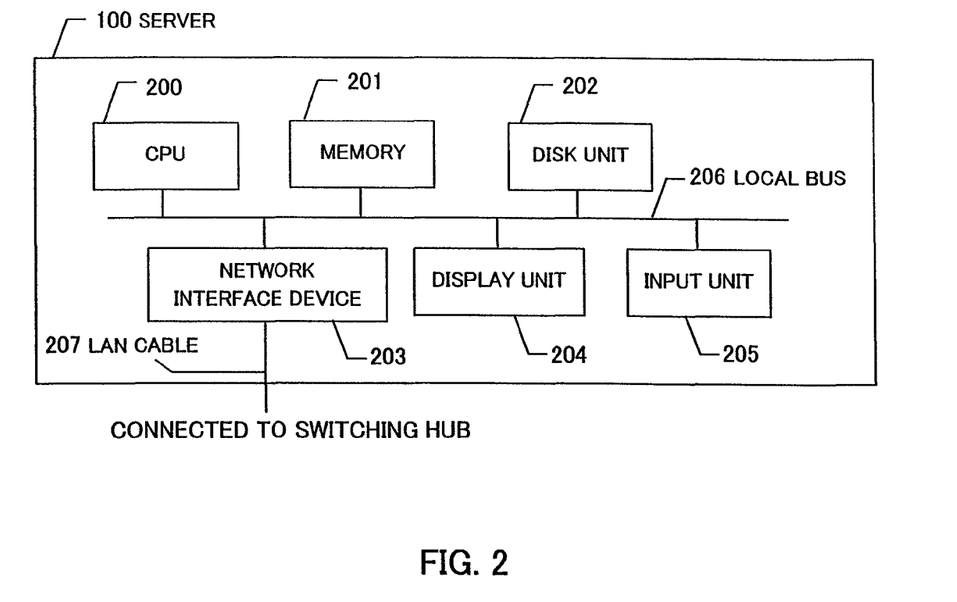
FIG. 2 is a hardware structural view of a VLAN server 100.

FIG. 2 is a hardware structural view of the VLAN server 100.

In the VLAN server 100, a CPU 200 is connected to a memory 201, a disk unit 202, a network interface device 203, a display unit 204, and an input unit 205 through a local bus 206.

The disk unit 202 stores application programs for the VLANs 127 to 129, a TCP/IP stack program, a device driver program, and others. The CPU 200 develops a program stored in the disk unit 202, in the memory 201, and sequentially reads and executes the program. The network interface device 203 is connected to the switching hub 113 with a LAN cable 207, and transmits and receives frames for communications between the VLAN server 100 and the clients 121 to 126 in the VLANs 127 to 129.

Figure 3:
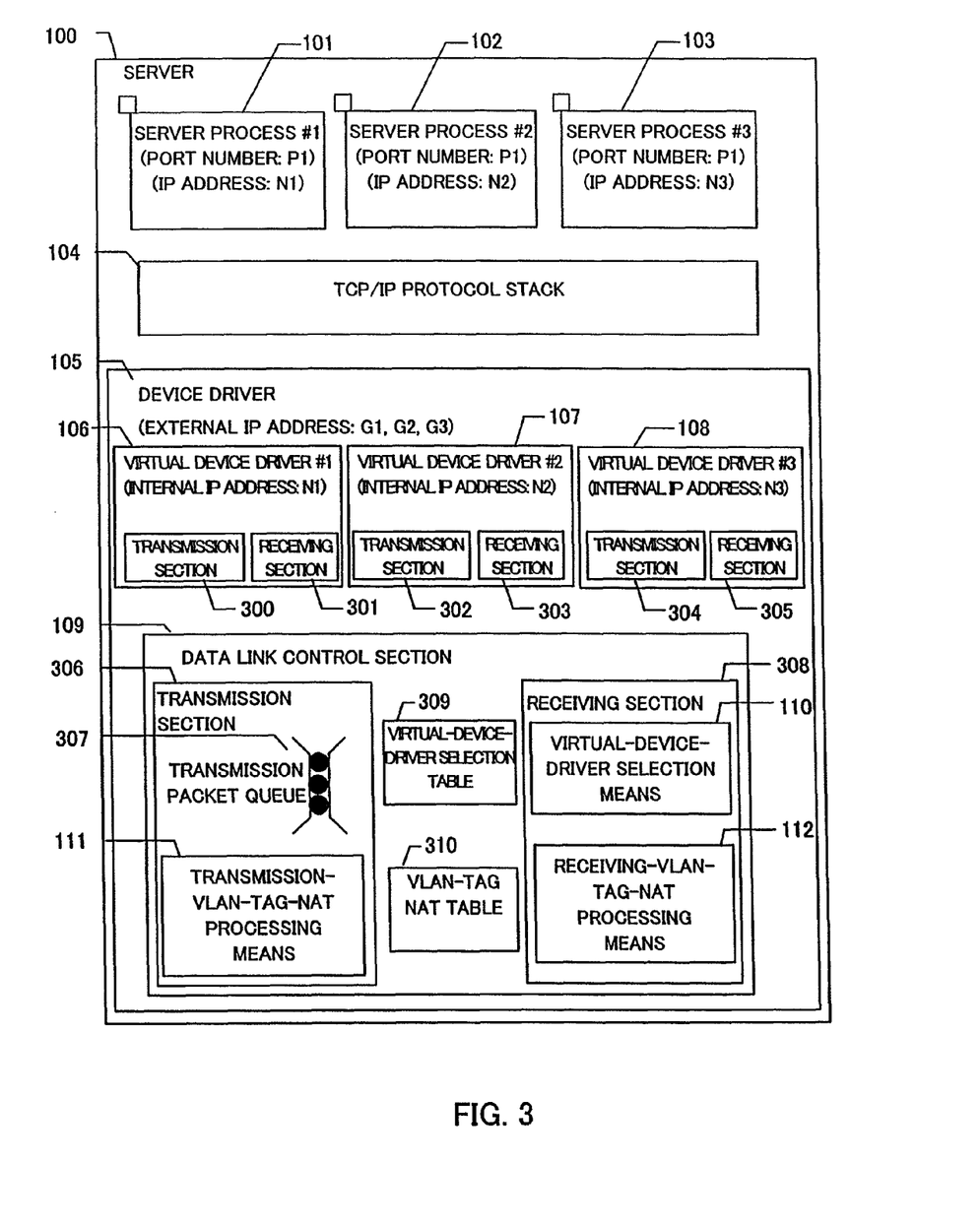
FIG. 3 is a software configuration view of the VLAN server 100.

FIG. 3 is a software structural view of the VLAN server 100.

The server process 101 (server process #1) for providing service for the VLAN 127 (VLAN #1), the server process 102 (server process #2) for providing service for the VLAN 128 (VLAN #2), and the server process 103 (server process #3) for providing service for the VLAN 129 (VLAN #3) are provided. Since these server processes perform the same type of service, they have the same port number (P1) and different IP addresses, N1, N2, and N3. When the server processes perform different types of services, they have different port numbers.

The TCP/IP stack 104 for performing network protocol processing, and the device driver 105 are provided. The device driver 105 is provided with the same number of virtual device drivers 106 to 108 (virtual device drivers #1 to #3) as the number of the VLANs 127 to 129, and the data link control section 109. The virtual device drivers 106 to 108 have transmission sections 300, 302, 304, and receiving sections 301, 303, and 305, respectively.

The data link control section 109 is provided with a transmission section 306, a receiving section 308, a virtual-device-driver selection table 309, and a VLAN-tag NAT table (address change table) 310. The transmission section 306 has a transmission packet queue 307 for queuing transmission packets sent from the virtual device drivers 106 to 108, and the transmission-VLAN-tag-NAT processing means 111 for NATing the transmission-source IP addresses of the transmission packets. The receiving section 308 has the virtual-device-driver selection means 110 and the receiving-VLAN-tag-NAT processing means 112. All of these pieces are developed in the memory 201 of the VLAN server 100.

Figure 4:
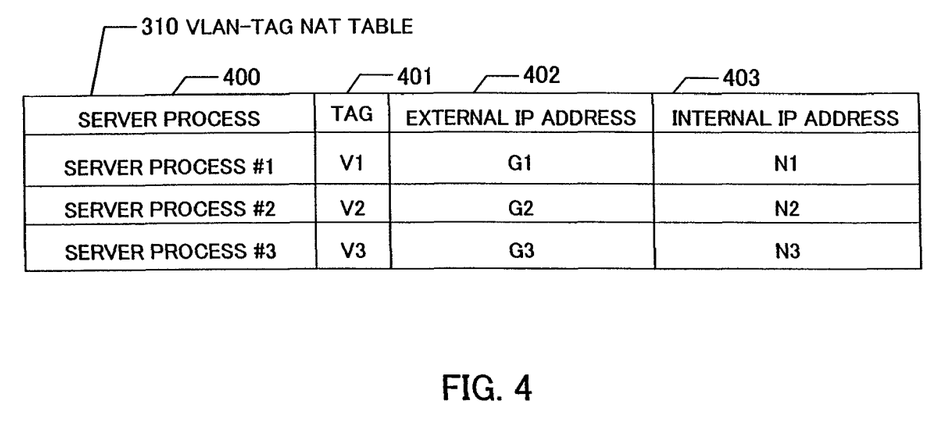
FIG. 4 is a view of a VLAN-tag NAT table 310.

FIG. 4 shows the VLAN-tag NAT table 310. The VLAN-tag NAT table 310 includes a server process column 400, a tag column 401, an external IP address column 402, and an internal IP address column 403. Specific values are placed in rows to make correspondence among the columns.

Figure 5:
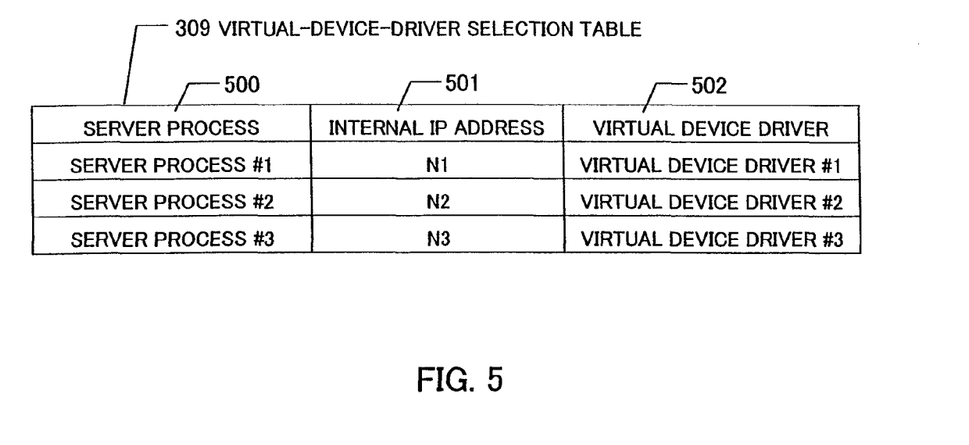
FIG. 5 is a view of a virtual-device-driver selection table 309.

FIG. 5 shows the virtual-device-driver selection table 309. The virtual-device-driver selection table 309 includes a server process column 500, an internal IP address column 501, and a virtual device driver column 502. Specific values are placed in rows to make correspondence among the columns.

Figure 6:
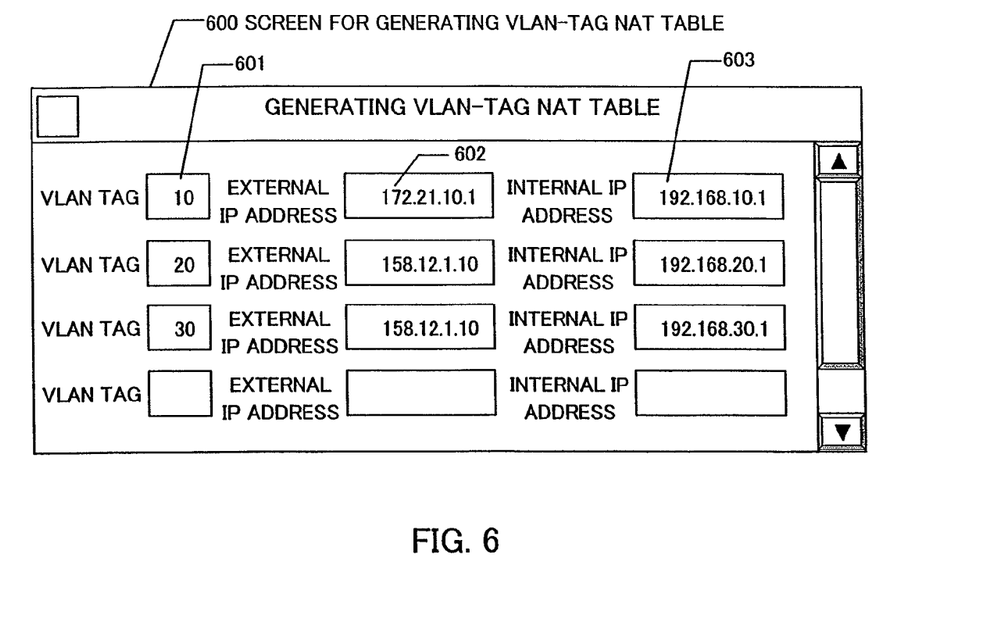
FIG. 6 is a view of a screen image displayed on a display unit 204 of the VLAN server 100, for generating the VLAN-tag NAT table 310.

FIG. 6 is a view of a screen image of the display unit 204 of the VLAN server 100, used for generating the VLAN-tag NAT table 310.

For one VLAN, a value is input to each of a VLAN tag input column 601, an external IP address input column 602, and an internal IP address input column 603. Since an internal IP address uniquely corresponds to the server process, it is not necessary to input any server processes here. The table may be configured, however, such that server processes should be input. With the use of the input values, the VLAN server 100 writes the VLAN tag value into the tag column 401, the external IP address value into the external IP address column 402, and the internal IP address value into the internal IP address column 403 on the same row in the VLAN-tag NAT table 310.

The VLAN server 100 generates a virtual device driver according to the input internal IP address with the use of the VLAN-tag NAT table 310, and writes the internal IP address into the internal IP address column 501 and the name of the virtual device driver into the virtual device driver column 502 on the same row in the virtual-device-driver selection table 309.

2. Operation of VLAN Server 2.1 From Client to Server

Figure 7:
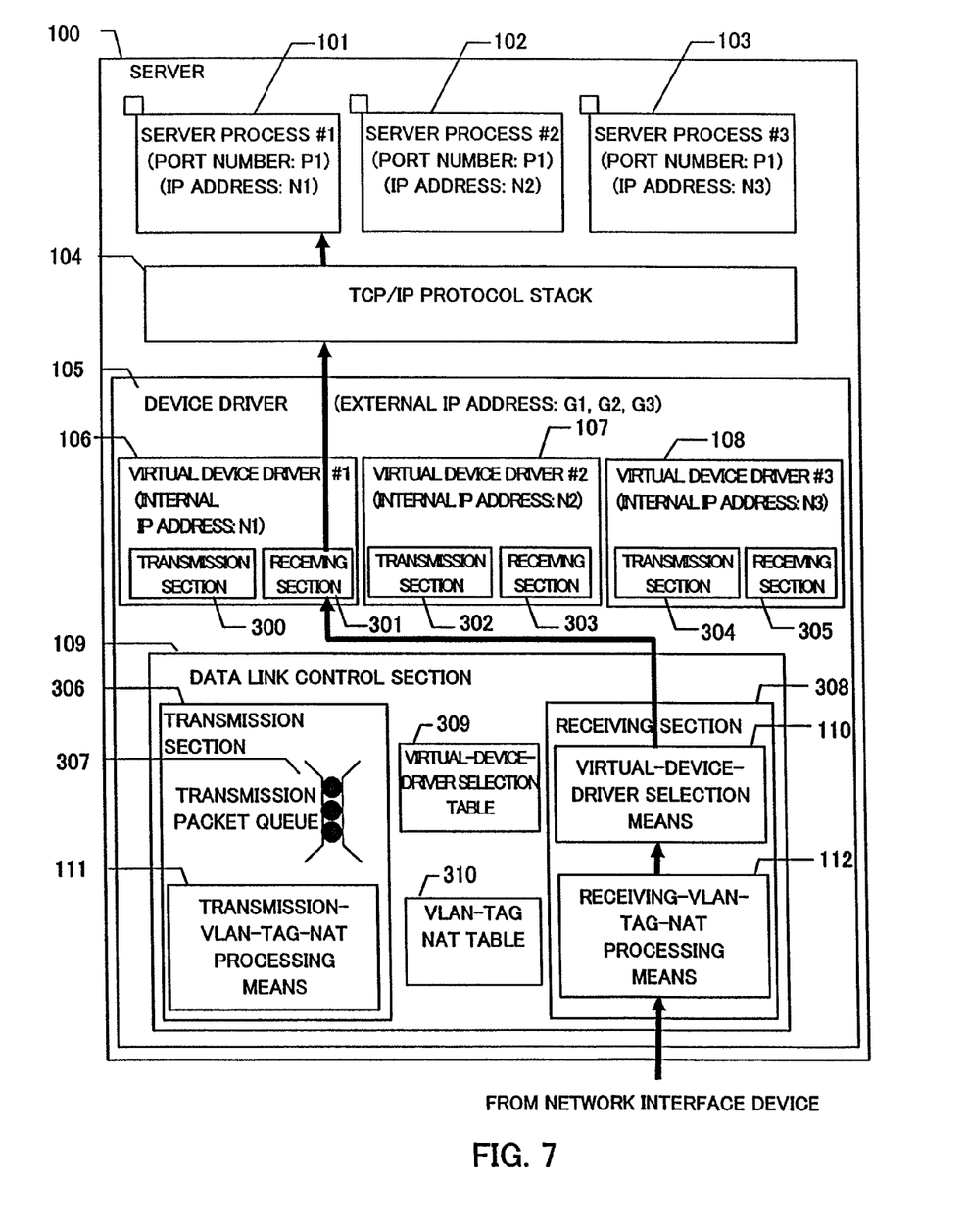
FIG. 7 is a view showing a data flow generated when the VLAN server 100 receives data.

FIG. 7 shows a data flow in the VLAN server 100, generated when a client in a VLAN transmits data to a server process in the VLAN server 100 in cases such as a case in which the client requests the server process to perform web search.

It is assumed here that the client is the client 121 (client #1-1) in the VLAN 127 (VLAN #1), and the server process in the VLAN server 100 is the server process 101 (server process #1). When the receiving section 308 of the data link control section 109 in the device driver 105 of the VLAN server 100 receives a MAC frame from the network interface device 203, the receiving-VLAN-tag-NAT processing means 112 obtains the internal IP address N1 corresponding to the VLAN tag V1, as shown in FIG. 4, which is extracted from the MAC frame with the use of the VLAN-tag NAT table 310, and changes the destination IP address from the external IP address G1 to the internal IP address N1. The receiving-VLAN-tag-NAT processing means 112 also deletes the MAC header to make an IP packet, and sends it to the virtual-device-driver selection section 110.

The virtual-device-driver selection section 110 uses the virtual-device-driver selection table 309 to select the virtual device driver 106 (virtual device driver #1) corresponding to the destination IP address N1 of the IP packet, as shown in FIG. 5.

The receiving section 301 of the virtual device driver 106 (virtual device driver #1) transmits the IP packet to the TCP/IP protocol stack 104 without applying any processing. The TCP/IP protocol stack 104 takes out the data from the IP packet, and sends it to the server process 101 (server process #1), having the IP address N1 and waiting for data to be received.

Figure 8:
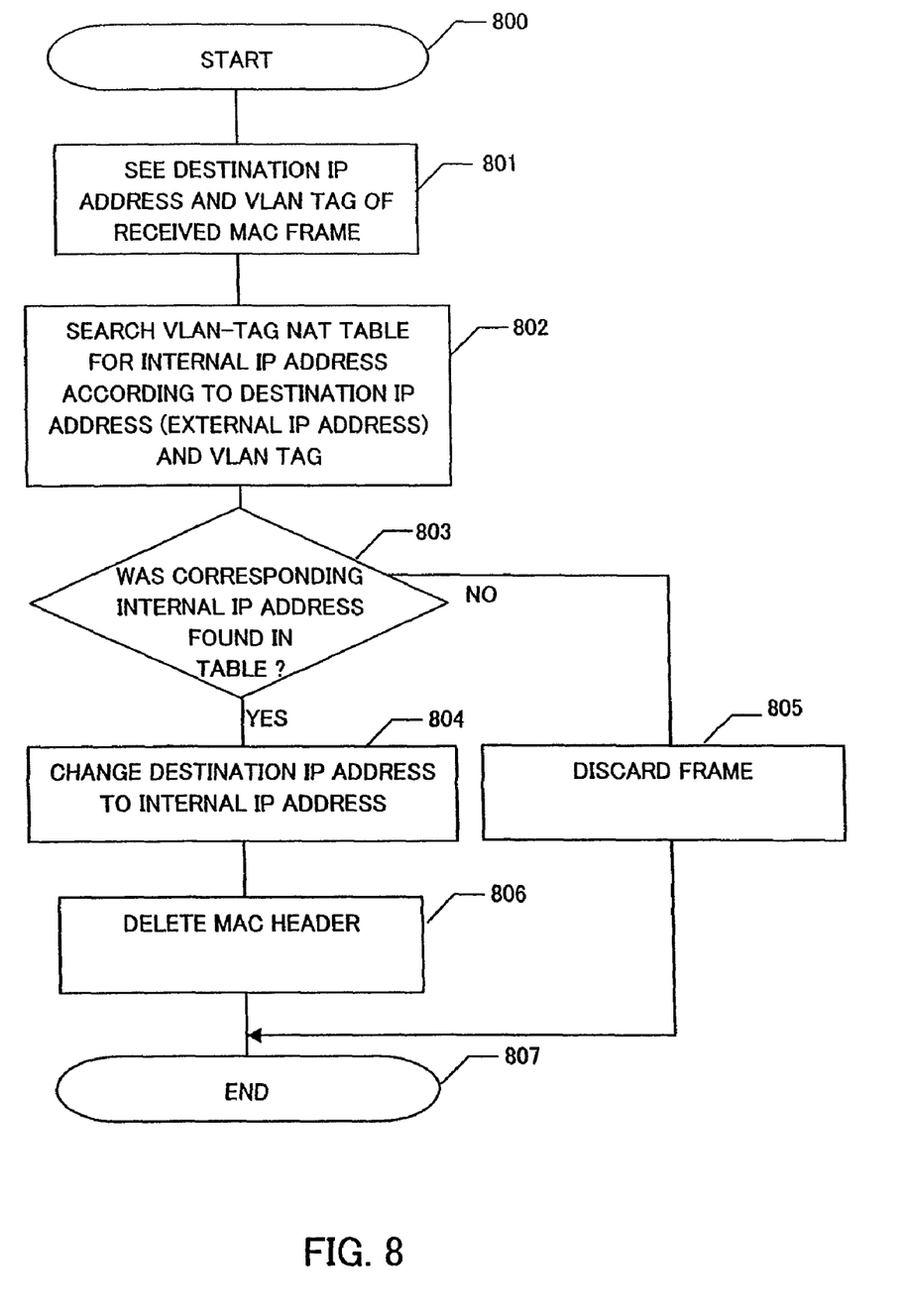
FIG. 8 is a flowchart of the processing of receiving-VLAN-tag-NAT processing means 112.

FIG. 8 is a flowchart of the processing of the receiving-VLAN-tag-NAT processing means 112.

The receiving-VLAN-tag-NAT processing means 112 refers to the destination IP address and the VLAN tag of a received MAC frame in step 801 to search the VLAN-tag NAT table for the internal IP address in step 802. The receiving-VLAN-tag-NAT processing means 112 determines in step 803 whether the corresponding internal IP address was found. If it was not found, the receiving-VLAN-tag-NAT processing means 112 discards the frame in step 805. If the internal IP address was found, the receiving-VLAN-tag-NAT processing means 112 changes the destination IP address to the internal IP address obtained by the search, in step 804, and deletes a MAC header in step 806 to generate an IP packet.

Figure 9:
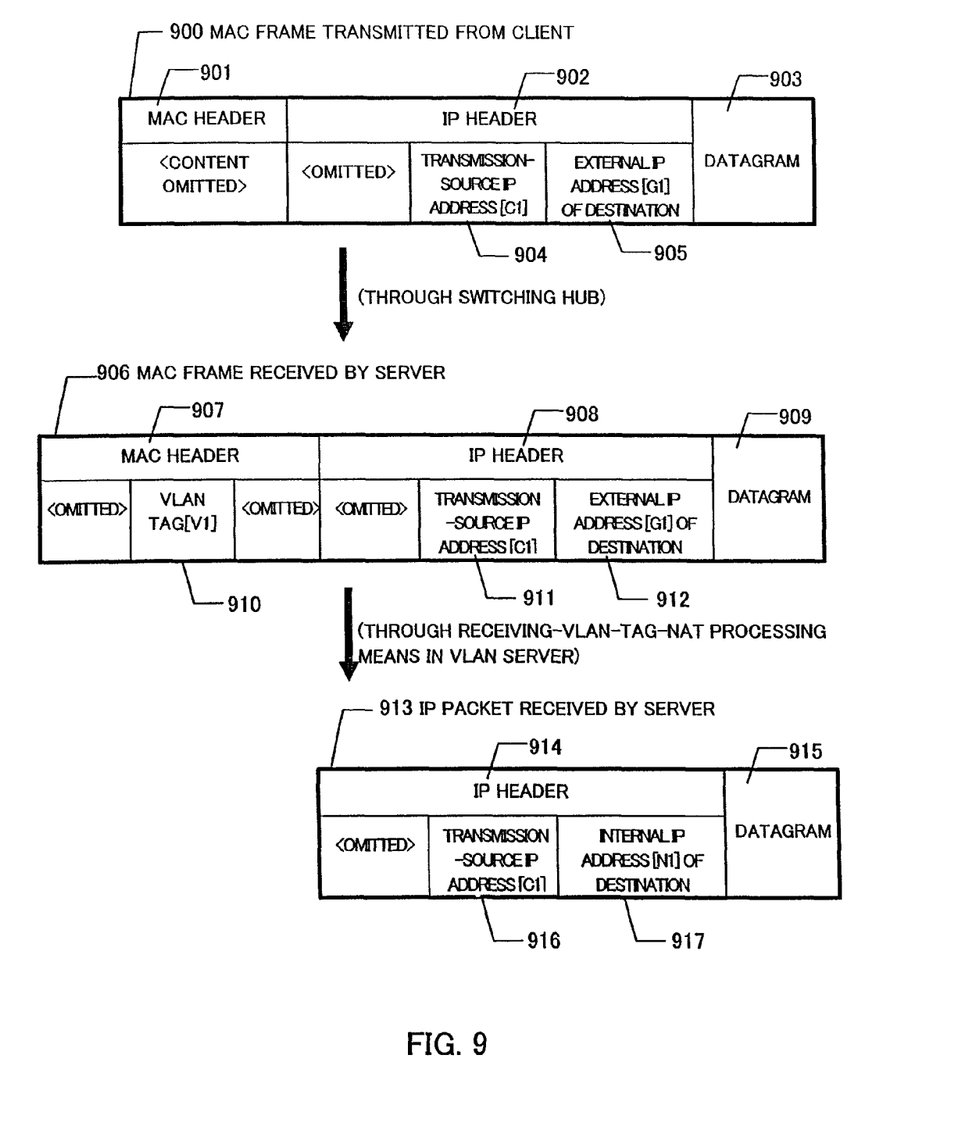
FIG. 9 is a view showing changes made to generate the IP packet from a MAC frame.

FIG. 9 shows changes made to generate the IP packet from the MAC frame in the description for FIG. 8.

A MAC frame 900 transmitted from a client includes a MAC header 901, an IP header 902, and datagram 903. The switching hub inserts a VLAN tag 911 into the MAC header 901, and sends the MAC frame 906 to the VLAN server 100. The MAC frame 906 received by the VLAN server 100 has a destination IP address 912 of G1 in an IP header 908. The destination IP address is changed to an internal IP address 917 of N1 of the destination when an IP packet is generated. The MAC header 907 is deleted. The other parameters are not changed.

2.2 From VLAN Server to Client

Figure 10:
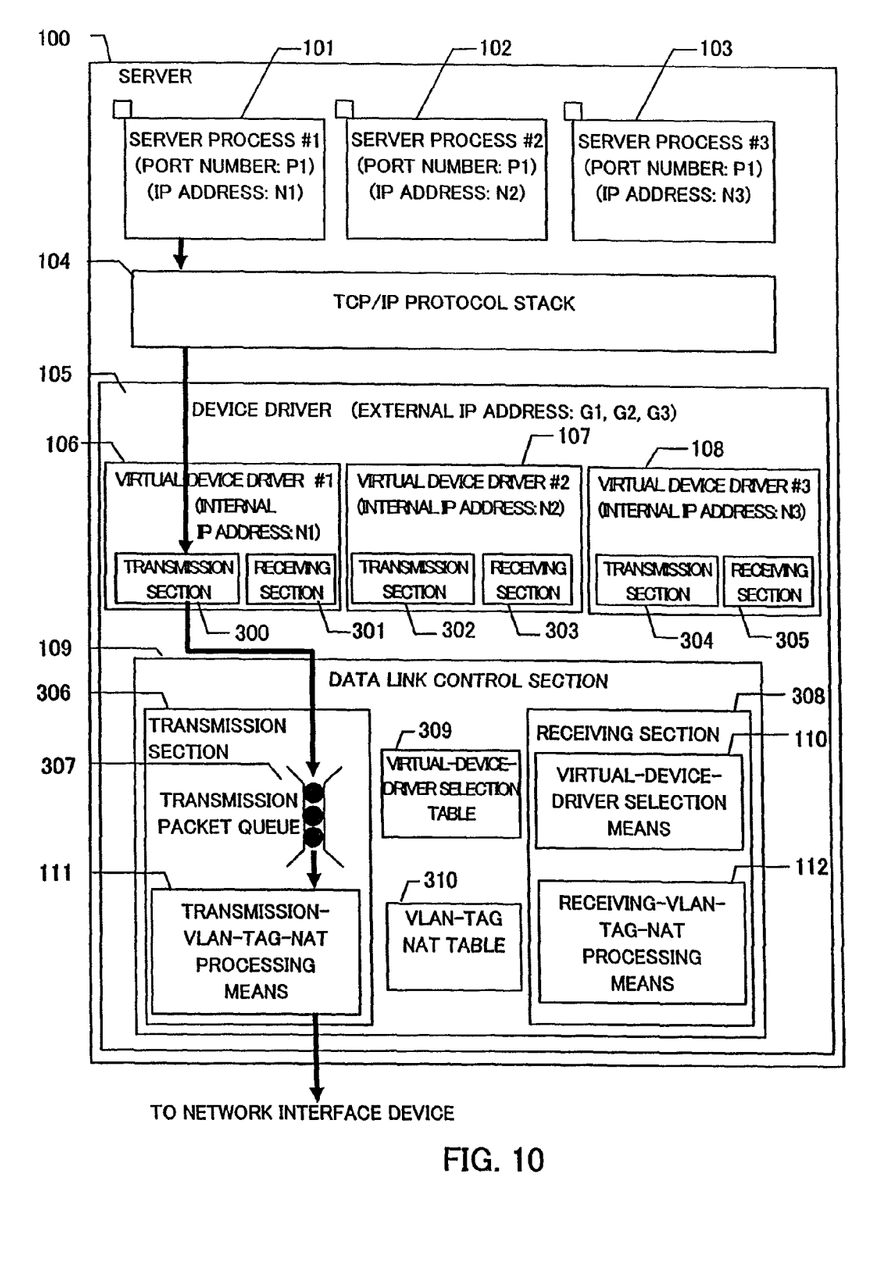
FIG. 10 is a view showing a data flow generated when the VLAN server 100 transmits data.

FIG. 10 shows a data flow in the VLAN server 100, generated when a server process in the VLAN server 100 transmits data to a client in cases such as a case in which the VLAN server returns the result of web search requested by the client.

It is assumed here as in FIG. 7 that the client is the client 121 (client #1-1) in the VLAN 127 (VLAN #1), and the server process in the VLAN server 100 is the server process 101 (server process #1). The server process 101 (server process #1) issues data which includes a transmission-source IP address set to an internal IP address of N1. The TCP/IP protocol stack generates an IP packet from the data, and sends it to the transmission section 300 of the virtual device driver 106 (virtual device driver #1) which has the same IP address N1.

The transmission section 300 of the virtual device driver 106 (virtual device driver #1) queues the IP packet in the transmission packet queue 307 of the transmission section 306 of the data link control section 109 without applying any processing. The transmission section 306 of the data link control section 109 takes out the queued element, that is, the IP packet, from the transmission packet queue 307, and sends it to the transmission-VLAN-tag-NAT processing means 111.

The transmission-VLAN-tag-NAT processing means 111 obtains the VLAN tag V1 and the external IP address G1 corresponding to the internal IP address N1 of the transmission source, as shown in FIG. 4, with the use of the VLAN-tag NAT table 310, and changes the transmission-source IP address in the IP packet from the internal IP address N1 to the external IP address G1. The transmission-VLAN-tag-NAT processing means 111 adds a MAC header to the IP packet to generate the MAC frame, and writes V1 in the VLAN tag of the MAC header.

The transmission-VLAN-tag-NAT processing means 111 sends the completed MAC frame to the network interface device 203. As described by referring to FIG. 3, the MAC frame is sent from the network interface device 203 to the VLAN 127 (VLAN #1) through the switching hub 113. The client 121 (client #1-1), who has the destination IP address, receives the MAC frame.

Figure 11:
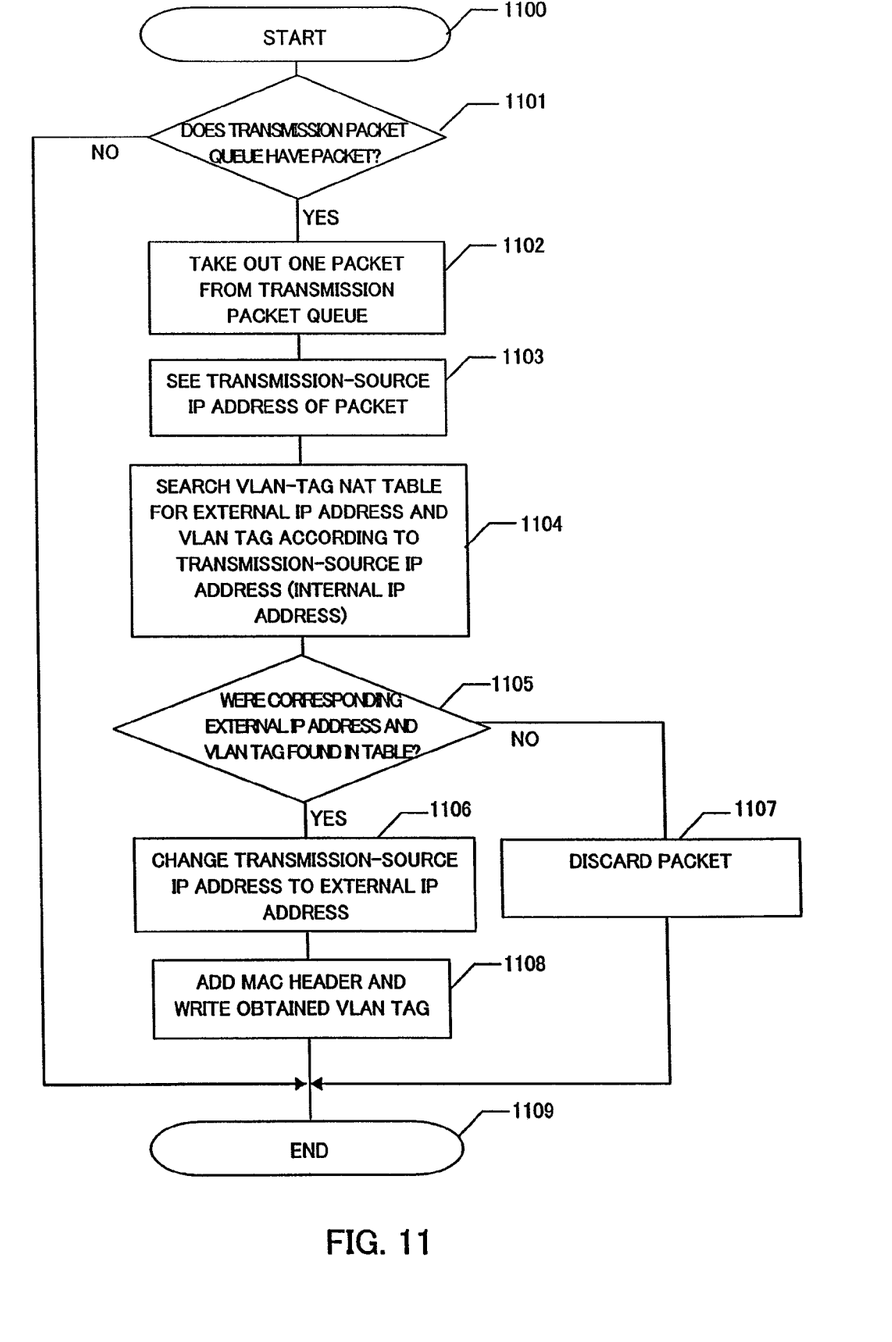
FIG. 11 is a flowchart of the processing of transmission-VLAN-tag-N-AT processing means 111.

FIG. 11 is a flowchart of the processing of the transmission-VLAN-tag-NAT processing means 111.

The transmission-VLAN-tag-NAT processing means 111 determines in step 1101 whether the transmission packet queue 307 is empty. When the transmission packet queue 307 is not empty, the transmission-VLAN-tag-NAT processing means 111 takes out one packet from the transmission packet queue 307 in step 1102, and refers to the transmission-source IP address of the packet in step 1103. The transmission-VLAN-tag-NAT processing means 111 uses the transmission-source IP address as an internal IP address, and searches the VLAN-tag NAT table for the external IP address and the VLAN tag according to the internal IP address in step 1104. The transmission-VLAN-tag-NAT processing means 111 determines in step 1105 whether the corresponding external IP address and VLAN tag were found. If they were not found, the transmission-VLAN-tag-NAT processing means 111 discards the packet in step 1107. If the corresponding external IP address and VLAN tag were found, the transmission-VLAN-tag-NAT processing means 111 changes the transmission-source IP address to the external IP address obtained by the search, in step 1106, and adds a MAC header and writes the obtained VLAN tag in the MAC header in step 1108.

Figure 12:
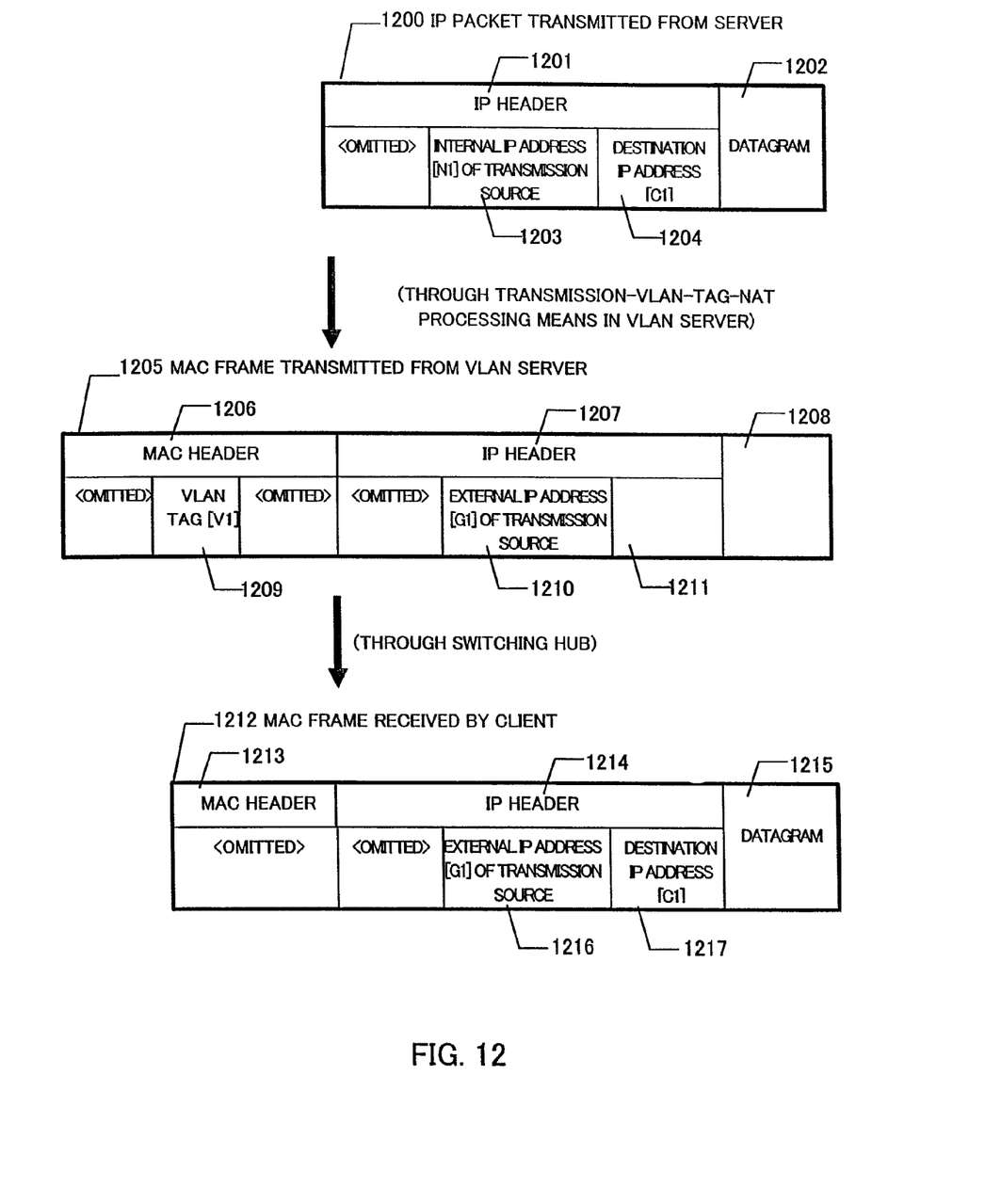
FIG. 12 is a view showing changes made to generate the MAC frame from an IP packet.

FIG. 12 shows changes made to generate the MAC frame from the IP packet in the description for FIG. 11.

A transmission-source IP address 1203 in the IP header 1201 of a transmission IP packet 1200 is N1. The transmission-source IP address 1203 is changed to the corresponding external IP address G1 1210 when a MAC frame is generated from the packet. A MAC header 1206 is added. V1 is written into the VLAN tag 1209 of the MAC header 1206. The other parameters are not changed. The switching hub removes the VLAN tag from the transmission MAC frame as shown in a MAC header 1213, and then sent to the client.

The present invention provides a plurality of VLANs with services by one physical VLAN server. In the present embodiment, the VLAN server is connected to the plurality of VLANs through the switching hub, which is one of concentrators. The structure of the system is not limited to that in the embodiment. The VLAN server may be connected to a plurality of VLANs directly, through another network, or through an apparatus. The VLAN server may delete and add the VLAN tag of the switching hub inside the server.

What is claimed is:

1. A method for processing data received from a client via at least one VLAN by a server which communicates with the client, the method comprising:
    obtaining a second destination IP address from one or more internal IP addresses of the server, based on a VLAN tag included in a MAC header of a MAC frame received via the VLAN and a first destination IP address included in an IP header of the MAC frame, the first destination IP address which is an external IP address of the server,
    changing the first destination IP address of the IP header to the second destination IP address,
    generating an IP packet by deleting the MAC header from the MAC frame,
    selecting one of a plurality of virtual-device-drivers based on the second destination IP address,
    transmitting the generated IP packet to the selected virtual-device-driver,
    transmitting the IP packet to a TCP/IP stack by the selected virtual-device-driver, and
    transmitting data included in the IP packet based on the second destination IP address by the TCP/IP stack, to one of a plurality of processes which provide service.

2. A method according to claim 1, further comprising:
    storing the second destination IP address, the VLAN tag and the first destination IP address, correspondingly,
    wherein, by using the stored information, the second destination IP address is obtained based on the VLAN tag and the first destination IP address.

3. A method according to claim 1, further comprising:
   storing the second destination IP address and information identifying the virtual-device-driver, correspondingly, and,
   wherein, by using the stored information, a virtual-device-driver among the plurality of virtual-device-drivers is selected based on the second destination IP address.

4. A method according to claim 1, wherein the number of the virtual-device-drivers is at least the number of the VLAN or the VLANs which receives or receive data.

5. A method for transmitting data to at least one VLAN by a server which communicates with a client, comprising:
   sending data to a TCP/IP protocol stack by one of a plurality of processes which provide service,
   generating an IP packet by adding a first transmission-source IP address which is set from one or more internal IP addresses of the server and corresponds to the process which sends the data, to the data, by the TCP/IP protocol stack,
   transmitting the generated IP packet to a virtual-device-driver corresponding to the first transmission-source IP address among a plurality of virtual-device-drivers, by the TCP/IP protocol stack,
   receiving the transmitted IP packet from the virtual-device-driver corresponding to the first transmission-source IP address,
   obtaining, based on the first transmission-source IP address of the IP header of the IP packet, a VLAN tag and a second transmission-source IP address which is an external IP address of the server,
   changing the first transmission-source IP address of the IP header to the second transmission-source IP address,
   generating a MAC frame by adding a MAC header to the IP packet, and writing the VLAN tag to the MAC header, and
   transmitting the MAC frame via the VLAN.

6. A method according to claim 5, further comprising:
   storing the first transmission-source IP address, the VLAN tag and the second transmission-source IP address, correspondingly,
   wherein, by using the stored information, the VLAN tag and the second transmission-source IP address are obtained based on the first transmission-source IP address.

7. A method according to claim 5, further comprising:
   storing correspondence of the first transmission-source IP address and the virtual-device-driver,
   wherein, by using the stored information, the IP packet is transmitted to the virtual-device-driver corresponding to the first transmission-source IP address, by the TCP/IP protocol stack.

8. A method according to claim 5, wherein the number of the virtual-device-drivers is at least the number of the VLAN or the VLANs which receives or receive data.

* * * * *